United States Patent

[11] 3,614,227

[72] Inventors Kenyon P. George
Arcadia;
Edouard Horace Siegler, Jr., Claremont, both of Calif.
[21] Appl. No. 844,835
[22] Filed July 25, 1969
[45] Patented Oct. 19, 1971
[73] Assignee Cary Instruments
Monrovia, Calif.

[54] GRATING DRIVE MECHANISM
14 Claims, 5 Drawing Figs.

[52] U.S. Cl. .................................................. 356/95,
350/162 R, 356/97, 356/100
[51] Int. Cl. .................................................. G01j 3/06,
G01j 3/18, G01j 3/42
[50] Field of Search ......................................... 350/162,
162 R; 356/74–101

[56] References Cited
UNITED STATES PATENTS
3,144,498  8/1964  Alpert et al. .................. 356/100 X
3,242,797  3/1966  Sundstrom .................... 356/96
3,306,158  2/1967  Makabe et al. ................ 356/101 X

OTHER REFERENCES

Herscher: "A Double-Beam Automatic Prism-Grating Infrared Spectrophotometer," Spectrochimica Acta, No. 11, 1959, pages 901– 908

*Primary Examiner*— Ronald L. Wibert
*Assistant Examiner*— F. L. Evans
*Attorney*— White & Haefliger ABSTRACT: The invention concerns an optical grating drive apparatus wherein a carriage for multiple diffraction gratings is movable between a plurality of locations, there being stops to limit carriage movement at such locations in which different gratings are selectively presented in the path of an incident beam; also a plurality of cam followers are shiftable relative to rotary cam means between positions in which different followers selectively engage the cam means and are displaced in response to cam means rotation; the followers and carriage have operative interconnection such that when a selected follower is engaged with the cam means the carriage may occupy alternate locations in order to selectively present corresponding gratings to the beam path; and displacement of a selected follower in response to cam rotation effects rotation of a selected grating in the beam path.

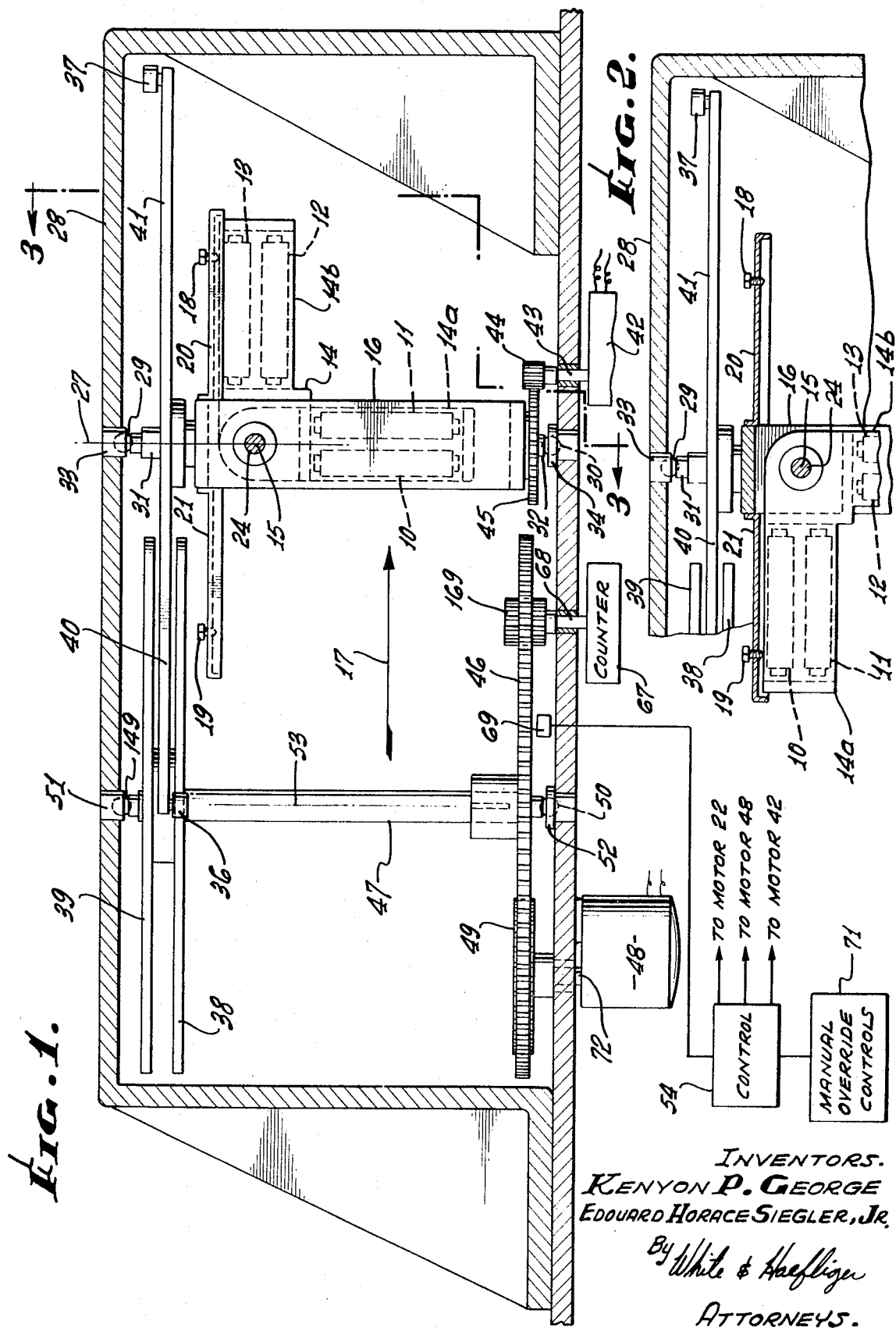

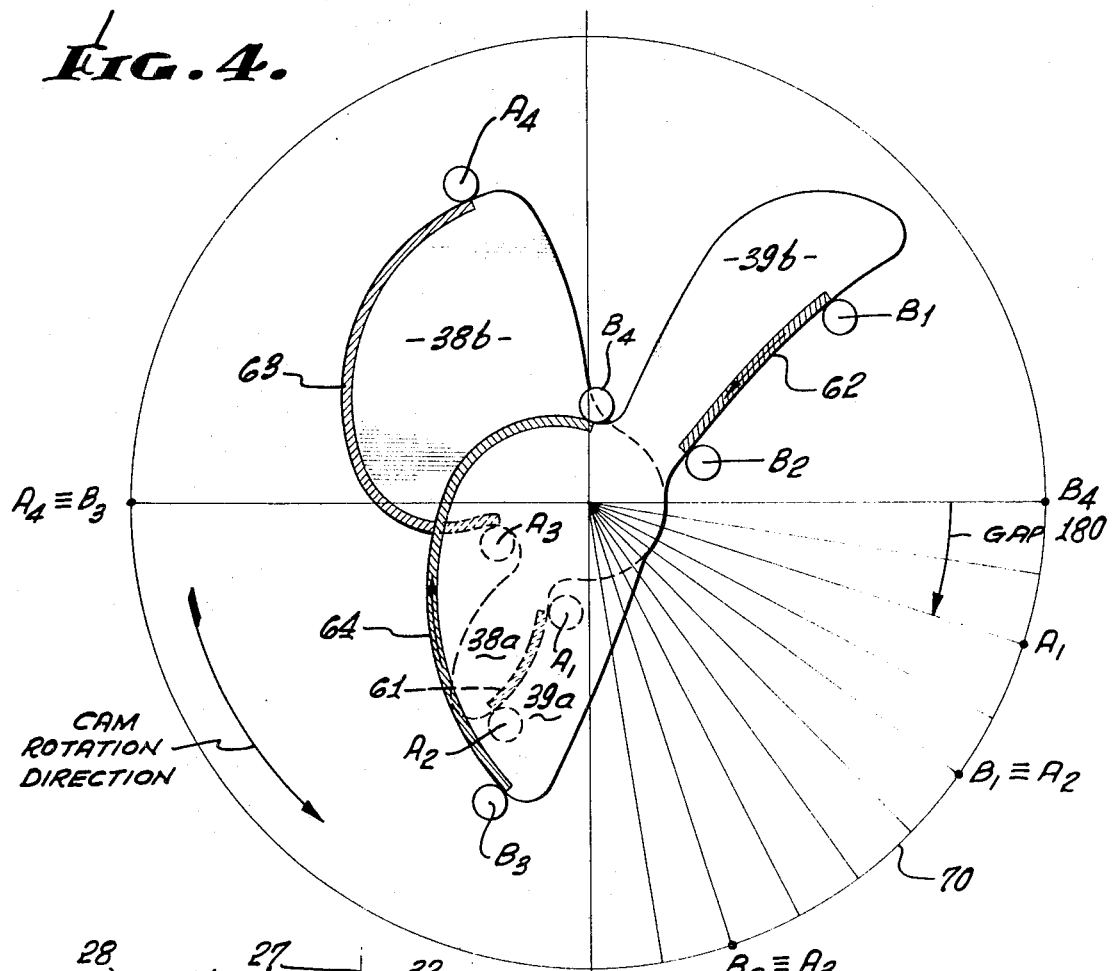
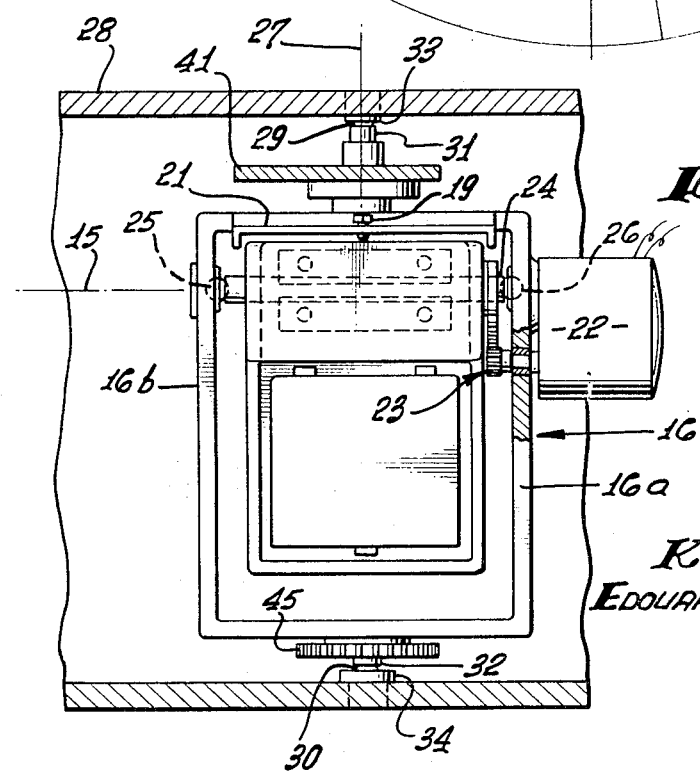

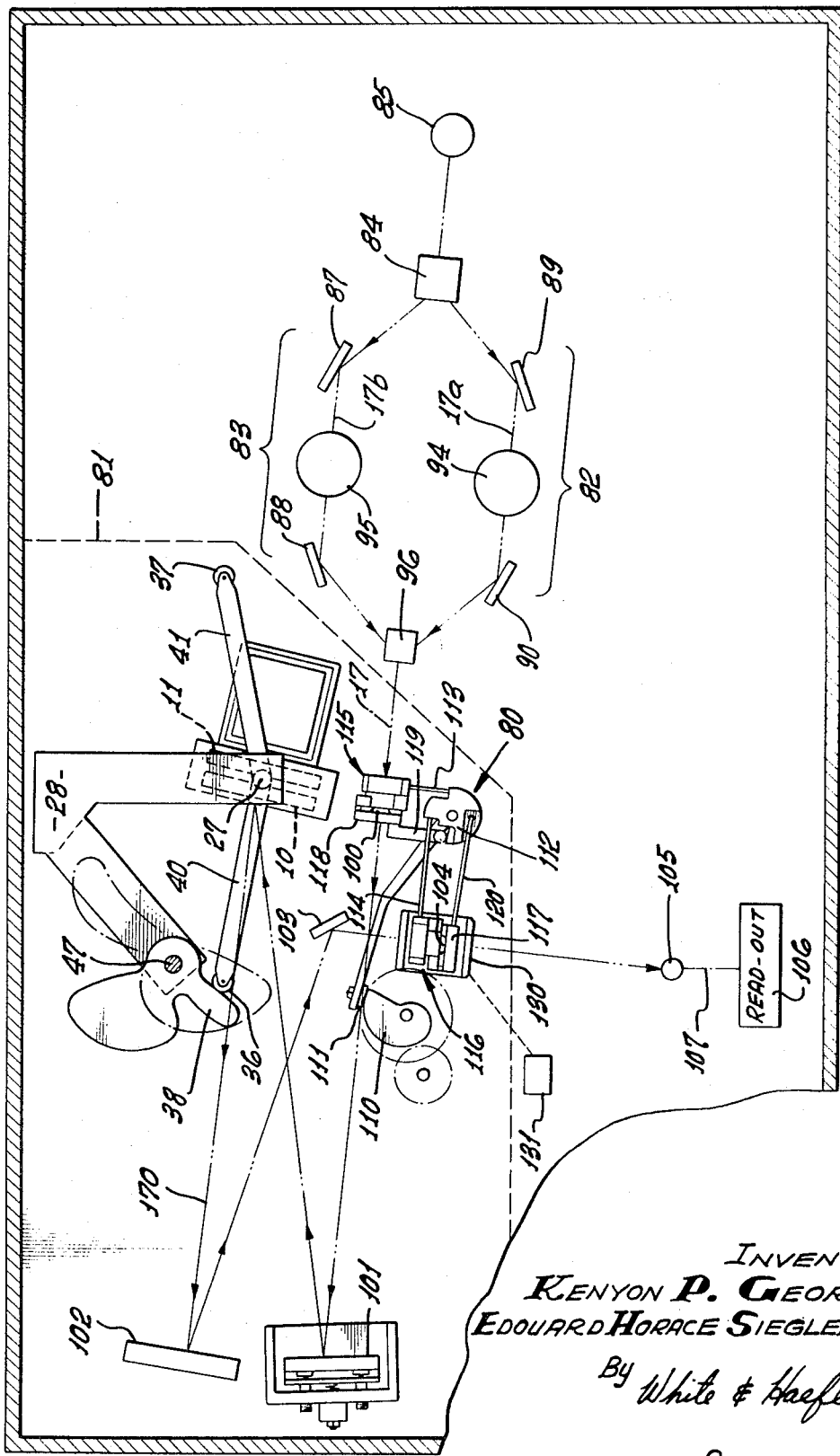

GRATING DRIVE MECHANISM

BACKGROUND OF THE INVENTION

This invention relates generally to diffraction-grating monochromators used as for example in spectrophotometers, and more particularly concerns multiple-grating drive apparatus characterized as of unusual advantage in such monochromators.

Spectrophotometers are optical instruments used for recording spectra associated with electromagnetic radiation transmitted through a sample, the spectra-indicating characteristic radiation absorbances at different wavelengths. Useful in such instruments are monochromators operable to select, from a relatively broad spectrum of ultraviolet, visible or infrared radiation, a relatively narrow band of wavelengths of such radiation. Such a narrow waveband, defined as a "monochromatic" beam, is useful for various purposes, such as determining the spectral transmission or reflection characteristics of the specimen. As is known in the art, monochromators generally consist of a narrow "entrance" slit for defining a beam of broadband radiation, a lens or mirror for collimating the beam and directing it toward a dispersing element, a dispersing element (such as grating) for spreading the beam into a spectrum, and a lens or mirror (called the "telescope" or "secondary collimator") for receiving the dispersed radiation and focusing it in the plane (or, more rigorously, in a "focal surface" tangent to the plane) of a second ("exit") slit, which transmits only a relatively narrow part of the focused spectrum. The focused spectrum consists of an infinite array of overlapping monochromatic images of the entrance slit.

It has become desirable, for purposes of readout completeness in terms of wide wave number scanning, to provide multiple radiation dispersing gratings in the monochromator. In this regard, each grating may typically be ruled with a predetermined number of lines per millimeter, so that when the grating is rotated relative to the incident beam, the wave number readout associated with the beam diffracted from the grating will vary within a predetermined limited wave number cm.[1]) range. When a particular grating has been rotated to the end of its desired range, another grating is presented to the beam so that the wave number readout may continue through an extended range.

However, certain problems arise when multiple gratings are used. These include the problem of scanning interruption while the gratings are repositioned for scanning with a different grating, with associated lack of continuity in data presentation; and the problem of breaks in spectra recordation during time intervals required for repositioning of gratings to be scanned. While such problems have to some extent been resolved, other remain. These include the difficulty of accurately positioning two or more movable gratings in the path of undispersed radiation, with repeatability; the problem (when using a cam drive for controlling grating rotation via follower mechanism) of cam reversal as is characteristically needed at grating change points, making start and stop points critical and requiring elaborate control apparatus; the problem (when using conventional single-cam-surface, single-follower systems in which a plurality of gratings is mounted on the follower for interchangeable positioning in the light beam) of an arbitrary and unwanted wavelength-scale change at each grating change point, on any recorder coupled to the cam drive; the difficulty of providing operator override of grating change points, in such inflexible prior-art systems; the problem (when using cosecant linkages) of long runback times and short follower arms at low wave numbers; and the need (not met prior to our invention) for a desirably highly reliable and trouble-free multiple-grating drive apparatus.

Additional disadvantages with known systems that incorporate cams and followers to secure grating displacement are as follows: systems employing a star wheel cam require cam advancement by a certain angular increment each time the grating is changed. Since the wavelength settings before and after the grating change must be identical, it is undesirable to move the recorder chart during grating changes as this would produce a "break" in the record. To avoid such a discontinuity, the chart in such a prior system must be decoupled from the star-cam drive before the cam is incrementally rotated at each grating change point. This introduces considerable complication and possible imprecision which the present invention avoids. Similarly, wave number readout counters must be disengaged and reengaged at grating change points with a star-cam drive.

Another prior system requiring undesirable backup of the main drive is one wherein a single cosecant mechanism is used to drive more than one grating. Since the proportionality factors are different for different gratings, it becomes necessary to reset the cosecant-bar mechanism and/or change the proportionality of the coupling between the wavelength and recorder drives each time a new grating is shifted into position, therefore, this prior system has two disadvantages; namely, it must be backed up in conjunction with a grating change and the recorder must be disengaged and then recoupled after the grating change.

SUMMARY OF THE INVENTION

It is a major object of the invention to provide an optical grating drive apparatus characterized as overcoming the above as well as other problems associated with prior drives. Basically, the apparatus includes, in combination, multiple diffraction gratings; a grating carriage movable between multiple locations, and stops to limit carriage movement at such locations in which different gratings are selectively presented in the path of an incident electromagnetic radiation beam, rotary cam means; multiple cam followers shiftable relative to the cam means between positions in which different followers selectively engage the cam means to be displaced in response to cam means rotation; and the followers and carriage having operative interconnection such that when a selected follower is engaged with the cam means the carriage may occupy alternate ones of said locations in order to selectively present corresponding gratings to the beam path, displacement of a selected follower, in response to cam means rotation, effecting rotation of a selected grating in the beam path. As will appear, there may be at least two gratings having associated wave number ranges which are generally discrete, but which overlap at the end portion of such ranges; also, means is provided to rotate the cam means, to shift the followers, and to so move the grating carriage in such interrelation that the four gratings are automatically presented to the beam path and rotated therein in predetermined sequence.

As regards unusual advantages, the invention enables the use of cam means that is not reversed when changing gratings, whereby wave number overlap as respects successive gratings in the beam path is enabled, with concomitant reduction in criticality of stopping sand starting points; manual override of the predetermined grating change point is enabled; continuous wave number readout by recorder or counter, free from the necessity to decouple and recouple the readout mechanism at grating change points, is enabled; and the use of objectionably imprecise detent mechanisms, for locating the changeable gratings in the beam path, is avoided because our system permits all motions to be terminated positively by engagement with "stops."

It is another object of the invention, considered with specific reference to a system comprising four gratings, to provide cam means having a first surface engaged by one cam follower when a first grating is presented to the beam path; a second surface engaged by another follower when a second grating is presented to the beam path; a third surface engaged by said one follower when a third grating is presented to the beam path; and a fourth surface engaged by said other follower when a forth grating is presented to the beam path. As will appear, the cam means may be rotated unidirectionally to bring these first through fourth surfaces relatively and sequentially into engagement with the followers in alternate relation, as referred to, and the cam means may typically include two axially spaced lobe sets, one of which defines the first and third surfaces, and the other of which defines the second and fourth surfaces.

It is a further object of the invention to provide support structure for the followers and carriage, and having a primary axis about which the followers are bodily swingable between their alternate positions of cam engagement, and one or more secondary axes about which the carriage is rotatable between its positively stopped locations (which accurately locate the selected grating in the beam path). Further, primary drive means may be provided to selectively urge the followers positively against the cam means for enabling accurate control of grating rotation via cam rotation; and secondary drive means may be provided to selectively and positively urge the carriage against such stops. Also, control means, responsive to cam rotation, is provided to effect operation of such drive means.

It is still another object of the invention to provide an unusually efficient and reliable spectrophotometer having a grating monochromator incorporating the gratings and drive apparatus referred to, and to pass the radiation beam through that monochromator. For example, the spectrophotometer typically includes sample and reference channels or spaces through which the beam is alternately transmitted in different paths outside the monochromator, the sample channel having a zone to contain a sample, the absorbance vs. wave number of which is to be determined. Also, beam separating and combining devices as well as monochromator slit width control mechanism is embodied in such a spectrophotometer, as will appear.

These and other objects and advantages of the invention, as well as the details of illustrative embodiments, will be more fully understood from the following detailed description of the drawings, in which:

DRAWING DESCRIPTION

FIG. 1 is a section illustrating the carriage of multiple gratings in relation to multiple cams and followers;

FIG. 2 is a fragmentary section of a portion of FIG. 1 showing a different location of the grating carriage;

FIG. 3 is a section taken on line 3—3 of FIG. 1;

FIG. 4 is a cam development diagram showing multiple follower positions in relation to rotation of the multiple cams; and FIG. 5 is an overall schematic view of a spectrophotometer incorporating the invention.

DESCRIPTION OF PREFERRED EMBODIMENT

In the drawings, multiple diffraction gratings are indicated at 10 and 11, and at 12 and 13, a carriage for the two sets of gratings appearing at 14. For example, gratings 10 and 11 may extend in spaced parallel relation on carriage arm 14a, and gratings 12 and 13 may extend in spaced parallel relation on carriage arm 14b, the two arms projecting at right angles with respect to a pivot axis 15. The carriage is mounted by support structure 16 to pivot about axis 15 between alternate locations. For example, in FIG. 1 grating 10 is in the path of incident light, indicated by arrow 17, whereas in FIG. 2, the carriage 14 has been rotated clockwise 90 degrees to bring grating 12 into the path of such light.

When the carriage 14 is in FIG. 1 position, a stop such at 18 limits carriage counterclockwise rotation about axis 15, whereas, in FIG. 2 position of the carriage, another stop such at 19 limits carriage clockwise rotation. Adjustable stops 18 and 19 may for example be carried by struts 20 and 21 integral with support structure 16, stop 18 engaging carriage arm 14b in FIG. 1, and stop 19 engaging carriage arm 14a in FIG. 2. FIG. 3 illustrates the provision of drive means to selectively and continuously urge the carriage arms against such stops the drive for example including a reversible motor 22 mounted to structure 16, gear train 23 and carriage shaft 24. Also shown are precision ball bearings 25 and 26 by which the ends of the shaft 24 are pivotally mounted to the legs 16a and 16b of support structure 16.

That support structure in turn has a primary axis 27 about which it is pivotable relative to the frame 28, there being ball bearings 29 and 30 by which the stub shafts 31 and 32 of the structure 16 are pivotally mounted to the frame, as via socket members 33 and 34. Note that axes 27 and 15 extend orthogonally. Such pivoting about axis 27 may, for example, result in a general reversal of the positions of the gratings 10 and 11 in FIG. 1, with respect to incident radiation 17; and likewise in a general reversal of the positions of the gratings 12 and 13 in FIG. 2, with respect to beam 17, all for purposes as will appear.

Support structure 16 may be regarded as one advantageous example of operative interconnection between carriage 14 and multiple cam followers which are shiftable relative to rotary cam means and between positions in which different followers selectively engage the cam means to be displaced in response to cam means rotation. In this regard, the mode of operation is such that when a selected follower is engaged with the cam means, the carriage may occupy alternate locations already described, in order to selectively present corresponding gratings to the beam path, displacement of a selected follower in response to cam means rotation effecting cam controlled rotation of a selected grating in the beam path.

In the example shown, the cam followers 36 and 37 in FIGS. 1, 2 and 5 are alternately engagable with cams 38 and 39, and are carried by support arms 40 and 41 integral with support structure 16 and projecting generally oppositely from axis 27 as may best be seen in FIG. 5. Thus the arms and followers may be integrally mounted to structure 16, and swing with structure 16 as by the drive means that includes a motor 42, shaft 43 and gears 44 and 45 respectively on the shaft and on support structure 16. The angle between arms 40 and 41 can be chosen to permit parallel orientation of the grating surfaces, thereby to minimize the distance from the optical surfaces to the axis of grating rotation. Motor 42 is operable to rotate either of followers 36 and 37 into engagement with a corresponding cam surface, and thereafter continuously to urge or press that follower in positive engagement with that cam. Another motor 48 drives a much larger gear 46 on cam shaft 47 (as via gear 49 on the motor shaft) for rotating the cams 38 and 39 referred to, in timed relation to swinging of the followers whereby the followers are alternately brought into engagement with a sequence of cam lobes acting as follower stops. The cams may therefore be rotated unidirectionally to effect a desired scan of an overall wave number range, as for example more than four wave number octaves. Note the precision ball bearings 149 and 50 mounting the ends of shaft 47 to frame 28, as via sockets 51 and 52, the axis of cam rotation being indicated at 53.

A control means, or programmer, is indicated at 54 in FIG. 1 and as having connection to motors 22, 44 and 48, and to a sensor 69 positioned to sense incremental rotation of the cam means, as for example by optically or magnetically sensing the rotary passage of shoulders or other indicators on gear 46 past the sensor. The control 54 is thereby responsive to progressive rotation of the cams to effect operation of the drive means (including motors 22, 48 and 42) to move the carriage between its alternate locations with respect to stops 18 and 19, and to shift the followers 36 and 37 between alternate positions of engagement with cams 38 and 39, with appropriate pauses in advancement of motor 48 and cams 38 and 39 while such moving and shifting take place, to provide for precision scanning as mentioned. Accordingly, the four gratings are automatically presented to the beam path 17, and rotated therein, in predetermined sequence.

Turning to the specific cam arrangement depicted in FIG. 4, one lobe set (including lobes 38a and 38b) is defined by cam 38 and another lobe set (including lobes 39a and 39b) is defined by cam 39. Note that the two lobe sets are axially spaced, as may be seen in FIG. 1, to selectively engage the correspondingly axially spaced followers. The lobes define first, second, third and fourth follower engagement surfaces 61–64 characterized in that surface 61 on lobe 38a engages follower 36 when grating 10 is presented to the beam path (as in FIG. 1); next, surface 62 on lobe 39b engages follower 37 when grating 11 is presented to the beam path (as by rotation of structure 16 about axis 27 in FIG. 1); next, surface 63 on lobe 38b engages follower 36 when grating 12 is presented to the beam path (by concurrent rotation of structure 16 about axis 27 and carriage 14 rotation about axis 15, obtaining the condition shown in FIG. 2); and finally, surface 64 on lobe 39a engages follower 37 when grating 13 is presented to the beam path (as by rotation of structure 16 about axis 27). The system may then be returned to its initial (FIG. 1) condition by rotation of carriage 14 about axis 15, concurrently with rotation of structure 16 about axis 27. The structure 16 thus rotates each time the gratings are to be changed, while carriage 14 only operates every other time. The shaded portions of the surface 61 64 indicate typical travels of the followers along such surfaces, which correspond to grating wave number ranges (defined by the range of rotation of a selected grating in the path of the incident beam) as follows:

| Surface | Travel | Presented Follower | Grating | Wavenumber Range |
|---|---|---|---|---|
| 61 | $A_1-A_2$ | 36 | 10 | $\nu_o-2\nu_o$ cm.$^{11}$ |
| 62 | $B_1-B_2$ | 37 | 11 | $2\nu_o-4\nu_o$ cm.$^{11}$ |
| 63 | $A_3-A_4$ | 36 | 12 | $4\nu_o-10\nu_o$ cm.$^{11}$ |
| 64 | $B_3-B_4$ | 37 | 13 | $10\nu_o-20\nu_o$ cm.$^{11}$ |

In the above, note that when follower 36 has reached position $A_2$, the cams cease rotation while follower 37 is shifted to position $B_1$; when follower 37 reaches position $B_2$; the cams cease rotation while follower 36 is shifted to position $A_3$, and while the carriage 14 rotates as already described; when follower 36 reaches position $A_4$, the cams cease rotation while follower 37 is shifted to position $B_3$; and when follower 37 reaches position $B_4$, there is no effective grating presentation to the beam 17 until the cams have rotated through gap 180, follower 36 has again shifted to position $A_1$, and the carriage 14 has rotated. The equivalent or effective angular motion of the pivot axis 27 of the structure 16, relative to the cams, carries that axis along the development circle 70, on which are shown by the same notations $A_1$ through $B_4$ the positions of axis 27 which correspond in time to the positions of followers 36 and 37. Multiple gratings are used for maximum efficiency, each grating then functioning in its spectral region of maximum efficiency.

Referring again to FIG. 1, a counter is shown at 67 with an input shaft 68 from a small gear 169 meshed with the teeth of gear 46 or 49, or by a separate gear train driven in common with 46 and 49 by or in synchronism with the shaft of motor 48. In this way, the counter may be made responsive to rotation of the different gratings, as well as of the cam means, to produce a count corresponding to the wave number associated with the degree of selected grating rotation in the path of the incident beam 17. For example, the counter could read 0,000 to 19,999 and return to 0,000 for 360° of cam rotation, to cover the wave number range $\nu_o$ to 20 $\nu_o$ cm.$^1$.

Further, the wave number ranges associated with the gratings may be made to have end overlap, whereby the count in the counter may accurately register both the last wave number output of a grating being shifted out of the path of beam 17 and the beginning wave number output of the next grating being shifted into the path of beam 17, such outputs being the same but varying together in accordance with slight changes in cam rotary position. Provision for end overlap in a system wherein the cam means has unidirectional rotation enables considerably simplification in the construction of the apparatus, without sacrifice of accuracy.

Other advantages of the apparatus include: high repeatability and amenability to design for fast runback to starting point; freedom from imprecisions associated with detent-type mechanisms; ability of the apparatus to be run in reverse; provision for grating rotation in the path of beam 17 about an axis relatively close to the grating surface (see axis 27 in FIG. 3); high reliability and trouble-free operation; and provision for manual override of grating change points, As to the latter, one advantageous way to secure same is to provide manual override controls 71 for the control 54 of FIG. 1.

Referring now to FIG. 5, the spectrophotometer incorporating the invention includes a grating monochromator generally indicated at 80 within the bounds of the broken line 81. The spectrophotometer also includes a beam separating device 84 receiving radiation from source 85 and operable to effect alternate transmission of the radiation beam in sample and reference paths or channels 82 and 83, suitable mirrors being provided as shown at 87—90. Like sample and reference holders are shown at 94 and 95 to transmit the radiation beams 17a and 17b, so that the sample absorbance vs. wave number may be determined.

The spectrophotometer also includes a beam combining device 96 operable to combine the beam transmission 17a and 17b in the channels 82 and 83, for transmission along a single path 17. The two beams may be combined for serial transmission thereof in sample and reference beam 17 passing through the monochromator.

Beam 17 is transmitted through the monochromator entrance slit 100 and then to the collimator 101, from which it is reflected for incidence on that grating in presented position (grating 10, in FIG. 5) as previously described. After diffraction by the grating, the resultant beam 170 (comprising dispersed radiation of wave number scanned in the manner described) passes to telescope or secondary collimator 102, from which it is reflected toward mirror 103 and then through the exit slit 104 of the monochromator —all as described in copending application, Ser. No. 654,746, of Vernon L. Chupp and Paul C. Grantz. From the slit 104 the beam passes to a photodetector 105 to which readout means 106 is electrically coupled at 107.

Means is provided to control the widths of the slits 100 and 104 to maintain constant the resolution parameter or the total reference beam energy, as preferred, of radiation transmitted to the detector. Such means may advantageously include the rotary cam 110 engaging follower 111 connected to crank 112 for rotating same; and links 113, 114, 119 and 120, connected to the slit knife edge deflectors 115, 116, 117 and 118 and operated by the crank to variably position those deflectors.

Radiation from source 85 may for example comprise infrared or other types. Readout 106 typically provides sample absorbance vs. wave number readings in ways which are common in the art of spectrophotometry.

A filter holder is shown at 130 for holding a series of filters selectively rotatable into the path of radiation from exit slit 104 to readout means 105. A drive for the filter holder is indicated at 131, it being operable, as from control 54 of FIG. 1, to place selected filters in radiation passing position in correspondence with placement of selected gratings in the path of the beam, as described.

It should also be noted that the cams may be rotated unidirectionally in the opposite or reverse direction, together with corresponding grating shift programming in a manner similar to that described.

While our invention has been described for definiteness in its embodiment as suitable for four gratings, skilled artisans in the field of grating drive design will recognize our concept's applicability to systems having many more than four gratings, and to systems having three or even two gratings —the portions of the invention and the advantages thereof applicable to only two gratings being, respectively (1) the use of more than one follower, mounted in mutually fixed relationship, with the gratings also fixed to the two followers; and (2) the capability of eliminating arbitrary and unwanted wavelength scale or wave number scale changes at the grating-change point, and the amenability to very flexible and noncritical operator control or override of the change point.

We claim:

1. Apparatus for locating and rotating a plurality of diffraction gratings mounted on nonparallel axes for mutually exclusive operation in the path of an optical beam of radiation to be dispersed, comprising
   a. a support structure mounted for rotation about a first axis;
   b. a grating carriage supported by said support structure for rotation about a second axis, which is nonparallel with respect to said first axis, and between two positions;
   c. a plurality of diffraction gratings carried on said carriage for rotation therewith about said second axis;
   d. stop means on said support structure for limiting movement of said carriage in said two positions;
   e. drive means for rotating said carriage about said second axis between said two positions;
   f. a plurality of cam followers supported for rotating said support structure about said first axis;
   g. a plurality of rotary cam means mounted for progressive surface engagement with, at any one time, at least one of said cam followers for rotating an operative one of said gratings with respect to said beam to be dispersed;
   h. means for rotating said plurality of cam means;
   i. and additional drive means for rotating said support structure about said first axis to move a selected one of the gratings into operative location in the path of said beam and to move a selected cam follower into surface engagement with the cam means.

2. The apparatus of claim 1 wherein the cam means have a first surface engaged by one cam follower when a first grating responsive to said one follower is presented to the beam path, and a second surface engaged by another follower when a second grating responsive to said other follower is presented to the beam path.

3. The apparatus of claim 2 wherein the cam means has a third surface engaged by said one follower when a third grating responsive to said one follower is presented to the beam path, and a fourth surface engaged by the other follower when a fourth grating responsive to said other follower is presented to the beam path.

4. The apparatus of claim 3 wherein the cam means has an axis of rotation, and includes two coaxially spaced lobe sets, one set defining said first and third surfaces, and another set defining said second and fourth surfaces.

5. The apparatus of claim 1 wherein said first and second axes extend in generally orthogonal relation.

6. Apparatus as defined in claim 1 including control means responsive to progressive rotation of said cam means to effect operation of said drive means to move the carriage between said positions and to shift the followers into selective engagement with the cam means.

7. The apparatus of claim 1 including spectrophotometer means having a grating monochromator incorporating said gratings and drive means, said spectrophotometer means characterized as providing for passage through the monochromator of said beam.

8. The apparatus of claim 3 wherein said spectrophotometer means includes sample and reference channels through which said beam is alternatively transmitted in different paths outside the monochromator, the sample channel having a zone to contain a sample whose absorbance vs. wave number is to be determined.

9. The apparatus of claim 8 wherein said spectrophotometer means includes a beam separating device operable to effect alternate transmission of said beam in said channels, and a beam combining device compatible with said beam separating device to combine the beam transmission in said channels for transmission along a single path.

10. The apparatus of claim 8 including a detector to receive radiation transmitted through the monochromator, and means to control the widths of beam passing monochromator entrance and exit slits.

11. The apparatus of claim 10 including multiple radiation filters corresponding to said gratings, and means to controllably position selected ones of the filters in the path of radiation transmitted to said detector in correspondence with selected grating presentation to said beam.

12. Apparatus as defined in claim 3 where the first through fourth gratings are ruled and blazed to define associated first through fourth wave number ranges, the first and second ranges having end overlap, the second and third ranges having end overlap, and the third and fourth ranges having end overlap.

13. Apparatus as defined in claim 3 wherein the gratings are ruled and blazed to define associated wave number/wavelength range during grating rotation in the paths of said beam, and including indicating means responsive to rotation of said cam means to produce a measure of the position within said wave number/wavelength range associated with the degree of selected grating rotation in the path of said beam.

14. For use in apparatus for locating and rotating a plurality of diffraction gratings for independent operation of a selected grating in the path of a beam of radiation to be dispersed, the combination comprising:
   a. a carriage for said gratings,
   b. first means for rotating the carriage about at least one axis to bring a selected grating into the beam path, said means including a plurality of cam followers,
   c. a plurality of cam means mounted for progressive surface engagement with, at any one time, at least one of said cam followers rotated by said first means into engagement with said cam means for effecting rotation of an operative one of said gratings in the path of and with respect to said beam to be dispersed,
   d. the cam means having a first surface engaged by one cam follower when a first grating responsive to said one follower is presented to the beam path, and a second surface engaged by another follower when a second grating responsive to said other follower is presented to the beam path,
   e. the cam means having a third surface engaged by said one follower when a third grating responsive to said one follower is presented to the beam path, and a fourth surface engaged by the other follower when a fourth grating responsive to said other follower is presented to the beam path,
   f. and the first through fourth gratings being ruled and blazed to define associated first through fourth wave number ranges, the first and second ranges having end overlap, the second and third ranges having end overlap, and the third and fourth ranges having end overlap,
   g. and means for coaxially rotating said plurality of cam means.